us005410337A

United States Patent [19]
Saito

[11] Patent Number: 5,410,337
[45] Date of Patent: Apr. 25, 1995

[54] IMAGE PROCESSING APPARATUS HAVING DITHER OPERATION FUNCTION

[75] Inventor: Akira Saito, Tokyo, Japan

[73] Assignee: Kabushiki Kaisha Toshiba, Kawasaki, Japan

[21] Appl. No.: 124,603

[22] Filed: Sep. 21, 1993

[30] Foreign Application Priority Data

Oct. 30, 1992 [JP] Japan .................. 4-292298

[51] Int. Cl.6 ............................ B41J 2/435
[52] U.S. Cl. ..................... 347/251; 358/298
[58] Field of Search .......... 346/107 R, 76 L, 1.1, 346/108, 160; 358/296, 298, 300, 302, 456, 457, 458

[56] References Cited

U.S. PATENT DOCUMENTS

| | | | |
|---|---|---|---|
| 4,758,897 | 7/1988 | Hiratsuka et al. | 358/298 |
| 4,772,911 | 9/1988 | Sasaki et al. | 346/140 R |
| 4,803,558 | 2/1989 | Hiratsuka et al. | 358/457 |
| 4,901,363 | 2/1990 | Toyokawa | 358/456 |
| 4,914,524 | 4/1990 | Kimura | 358/462 |

FOREIGN PATENT DOCUMENTS 56-90375 7/1981 Japan .
64-1072 1/1989 Japan .

Primary Examiner—Mark J. Reinhart
Attorney, Agent, or Firm—Cushman Darby & Cushman

[57] ABSTRACT

The estimated densities of an image input from a line sensor are calculated by density estimating sections, each having a scanning aperture, and multiple circuits. Thereafter, the directions in which the density of the image changes are identified by comparators. An aperture selecting section selects a scanning aperture to be used as a halftone density on the basis of the identification result and the determination result obtained by an image quality determining section, which result indicates whether the input image is a dither image or a binary image. Subsequently, re-dither processing or binarization processing is performed by an image processing section in accordance with the determination result obtained by the image quality determining section.

5 Claims, 6 Drawing Sheets

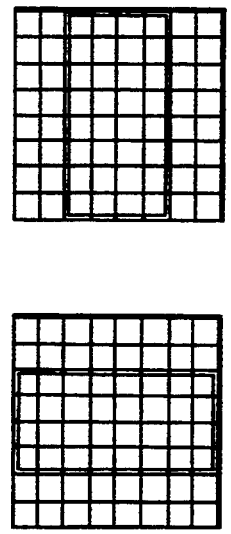

| BINARY COUNTER OUTPUT | DENSITY CHANGE | | | CODE | APERTURE SIZE OR SHAPE |
|---|---|---|---|---|---|
| | COMPARATOR 35 | COMPARATOR 37 | COMPARATOR 38 | | |
| 0 | — | | | 0 | 4 x 4 |
| 1 | 0 | 0 | 0 | 4 | 8 x 8 |
| 1 | 1 | 0 | 0 | 1 | 4 x 8 |
| 1 | 0 | 1 | 0 | 2 | 8 x 4 |
| 1 | 1 | 1 | 0 | 3 | RHOMBOID |
| 1 | 0 | 0 | 1 | 3 | RHOMBOID |
| 1 | 1 | 0 | 1 | 3 | RHOMBOID |
| 1 | 0 | 1 | 1 | 3 | RHOMBOID |
| 1 | 1 | 1 | 1 | 3 | RHOMBOID |

FIG. 9

IMAGE PROCESSING APPARATUS HAVING DITHER OPERATION FUNCTION

BACKGROUND OF THE INVENTION

1. Field of the Invention

The present invention relates to an image processing apparatus capable of performing enlargement/reduction processing of an image while also performing halftone processing of the image by the dither method.

2. Description of the Related Art

As a conventional image processing apparatus, a printer such as an electrophotographic printer described in, for example, Japanese Patent Application KOKAI Publication No. 56-90375 is available. This printer forms a pseudo halftone image by the dither method which is used to improve the gradation characteristics of a halftone image. In the dither method, a halftone image is processed by a dither matrix, especially an $8 \times 8$ dot concentration type dither matrix. In this case, seven types of scanning apertures are prepared on a dot concentration type dither image. The sizes of these scanning apertures are: $2 \times 2$, $4 \times 2$, $2 \times 4$, $4 \times 4$, $8 \times 4$, $4 \times 8$, and $8 \times 8$.

In this printer, after an image is read, the number of white pixels in each of the seven types of scanning apertures is calculated, and the calculation result is multiplied by a coefficient for correcting the influence of the size of each scanning aperture. Thereafter, the densities in the respective scanning apertures are compared with each other to determine a scanning aperture to be used, thus obtaining a pseudo halftone image.

As described above, in the conventional printer, a pseudo halftone image is formed by the dither method. However, in processing a halftone image by the dither method, since processes for obtaining estimated densities in a plurality of scanning apertures are sequentially executed one by one by programs, the overall processing speed of the apparatus becomes inevitably low.

SUMMARY OF THE INVENTION

It is an object of the present invention to provide an image processing apparatus which can solve the above-described problem, properly perform dither processing, and increase the overall processing speed of the apparatus.

In order to achieve the above object, according to the first aspect of the present invention, an image processing apparatus includes input means for inputting an image corresponding to a size of a dither matrix. A plurality of calculating circuits which are arranged in correspondence with a plurality of directions with respect to a conversion position as the center simultaneously calculate estimated densities of the image input by the input means in different scanning apertures. An identifying circuit identifies a direction in which the density of the image changes, on the basis of the estimated densities, in the scanning apertures, calculated by the calculating circuits. A halftone density determining circuit selects one of the estimated densities in the scanning apertures on the basis of the identification result obtained by the identifying circuit, and determines the selected estimated density as a halftone density to be used for the conversion position. A dither processing circuit performs dither processing with respect to the image by using the halftone density determined by the halftone density determining circuit.

In order to achieve the above object, according to the second aspect of the present invention, an image processing apparatus includes input means for inputting an image corresponding to a size of a dither matrix. An image quality determining circuit determines whether the image input by the input means is a dither image or a binary image. A plurality of calculating circuits which are arranged in correspondence with a plurality of directions with respect to a conversion position as the center simultaneously calculate estimated densities of the image input by the input means in different scanning apertures. An identifying circuit identifies a direction in which the density of the image changes, on the basis of the estimated densities, in the scanning apertures, calculated by the calculating circuits. A halftone density determining circuit selects one of the estimated densities in the scanning apertures on the basis of the identification result obtained by the identifying circuit and the determination result obtained by the image quality determining circuit, and determines the selected estimated density as a halftone density to be used for the conversion position. An image processing circuit performs re-dither processing by using the halftone density determined by the halftone density determining circuit when the determination result obtained by the image quality determining circuit indicates a dither image, and performs binarization processing when the determination result obtained by the image quality determining circuit indicates a binary image.

According to the first aspect, estimated densities at a conversion position of an input image corresponding to the size of a dither matrix are simultaneously calculated in a plurality of scanning apertures. The calculated estimated densities are compared with an estimated density in a scanning aperture having the same range as that of the dither matrix to identify the directions in which the density of the image changes. One of the estimated densities in the respective scanning apertures is determined as a halftone density to be used for the conversion position in accordance with the identification result. Dither processing is performed by using the determined halftone density.

According to the second aspect, estimated densities at a conversion position of an input image corresponding to the size of a dither matrix are simultaneously calculated in a plurality of scanning apertures. It is determined whether the input image is a dither image or a binary image. The calculated estimated densities are compared with an estimated density in a scanning aperture having the same range as that of the dither matrix to identify the directions in which the density of the image changes. One of the estimated densities in the respective scanning apertures is determined as a halftone density to be used for the conversion position in accordance with the identification result and the determination result indicating whether the input image is a dither image or a binary image. Re-dither processing is performed by using this halftone density when the input image is a dither image. When the input image is a binary image, binarization processing is performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 4A to 4E are charts showing various scanning apertures used by the respective density estimating sections in the embodiment;

FIGS. 6A and 6B are charts, each for explaining an operation of a scanning aperture of the density estimating section in FIG. 5;

FIG. 9 is a view showing a parameter table associated with an aperture selecting operation of the aperture selecting section in the embodiment.

DETAILED DESCRIPTION OF THE PREFERRED EMBODIMENTS

An embodiment of the present invention will be described in detail below with reference to the accompanying drawings.

Figure 1:
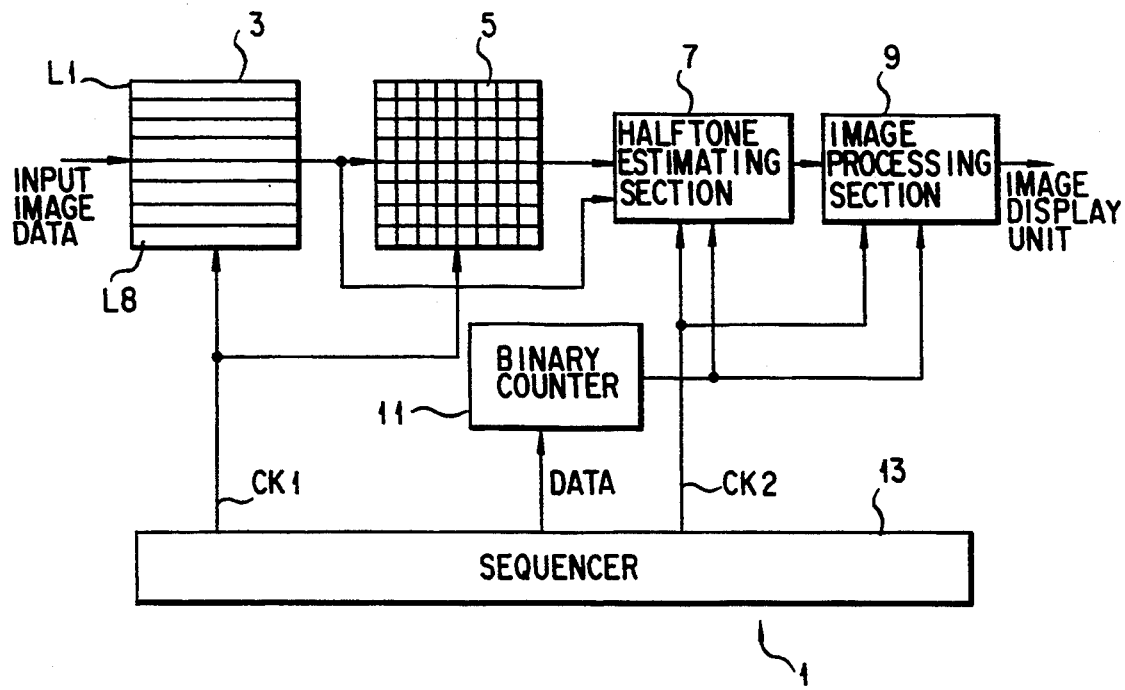
FIG. 1 is a block diagram showing the arrangement of an image processing apparatus according to an embodiment of the present invention.

The arrangement of an image processing apparatus of the embodiment will be described first with reference to FIG. 1. FIG. 1 is a block diagram showing the arrangement of the image processing apparatus of the embodiment.

An image processing apparatus 1 has a line memory 3. The line memory 3 is a memory capable of storing pixels of 8 lines L1 to L8.

The output terminal of each line of the line memory 3 is connected to a corresponding input terminal of a reference pixel memory 5. The reference pixel memory 5 is a memory for storing 8×8 pixels, i.e., 64 pixels, centered on a pixel at the central position of density conversion (to be described later), of all the pixels stored in the line memory 3.

The output terminals of the line memory 3 and the reference pixel memory 5 are respectively connected to the first and second input terminals of a halftone estimating section 7. The halftone estimating section 7 (to be described in detail later) has a plurality of types of parallel scanning apertures and calculates estimated densities in the respective scanning apertures independently and simultaneously. After the calculations, the halftone estimating section 7 selects an estimated density most suitable for a conversion position. The estimated density selected by the halftone estimating section 7 will be referred to as a halftone density hereinafter.

The output terminal of the halftone estimating section 7 is connected to the first input terminal of an image processing section 9. The image processing section 9 performs either re-dither processing or binarization processing by using halftone density data input from the halftone estimating section 7. In order to perform such processing, the image processing section 9 comprises a circuit including a dither matrix for re-dither processing and a circuit including a fixed threshold value for binarization processing. The image processing section 9 performs re-dither processing when a dither image is input, and performs binarization processing when a binary image is input. This re-dither processing or binarization processing is selectively performed by an image quality determining section 11 (to be described later).

The output terminal of the image quality determining section 11 is connected to the third input terminal of the halftone estimating section 7 and to the second input terminal of the image processing section 9. In this embodiment, the image quality determining section 11 is constituted by a binary counter. The image quality determining section 11 outputs "1" as a determination result when an image input from the line memory 3 is a dither image; and "0" as a determination result when an input image is a binary image expressed by a line or a character. More specifically, the image quality determining section 11 checks the presence/absence of periodicity between a given black pixel and the next black pixel of an input image to determine whether the input image is a dither image or a binary image. Note that an input image, e.g., a dither image, may be treated as a binary image depending on the coarseness or fineness of the input image. In this case, however, a dither image is discriminated as a dither image; and a binary image, as a binary image.

The input terminal of the binary counter 11 as the image quality determining section is connected to the image data output terminal of a sequencer 13 serving as a control section. The sequencer 13 sequentially outputs clock signals and the like for controlling the respective operations of the image processing apparatus 1. An output terminal of the sequencer 13, from which a first clock CK1 is output, is connected to the clock input terminal of the line memory 3 and to the clock input terminal of the reference pixel memory 5. Another output terminal of the sequencer 13, from which a second clock CK2 is output, is connected to the clock input terminal of the halftone estimating section 7 and to the clock input terminal of the image processing section 9.

The sequencer 13 serving as a control section outputs the clock signals CK1 and CK2. The image processing apparatus 1 executes operations such as halftone density determination and enlargement/reduction of an image in synchronism with these clock signals.

Figure 2:
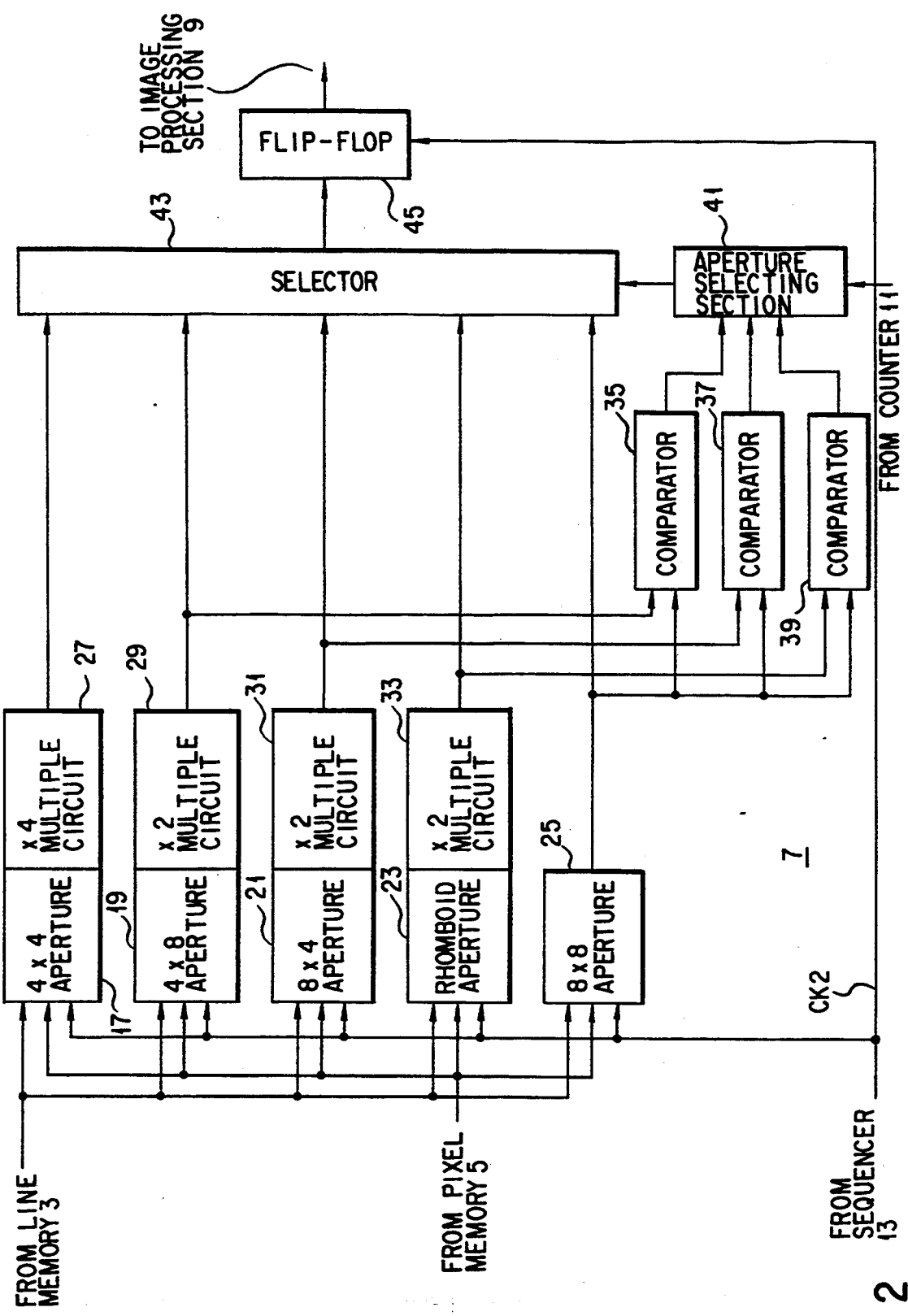
FIG. 2 is a block diagram showing the arrangement of a halftone estimating section in the embodiment.

The arrangement of the halftone estimating section 7 in the embodiment will be described next with reference to FIG. 2. FIG. 2 is a block diagram showing the arrangement of the halftone estimating section in the embodiment.

The halftone estimating section 7 includes density estimating sections 17, 19, 21, 23, and 25 as individual circuits. These density estimating sections 17, 19, 21, 23, and 25 have different scanning apertures and respectively calculate the number of black pixels in the scanning apertures at once. These scanning apertures will be described in detail later.

The density estimating sections 17, 19, 21, 23, and 25 respectively receive pixel data from the line memory 3 and the reference pixel memory 5, which data represent pixel counts corresponding to the sizes of the respective apertures. Multiple circuits 27, 29, 31 and 33 are respectively connected to the density estimating sections 17, 19, 21, and 23, excluding the density estimating section 25. These multiple circuits 27, 29, 31, and 33 serve to normalize the differences between the area of the scanning aperture of the density estimating section 25 and those of the remaining density estimating sections. With this arrangement, black pixel counts in the respective scanning apertures are output, as estimated densities, from the density estimating sections 25, 27, 29, 31, and 33 in the form of, e.g., 7-bit signals.

Figure 3:
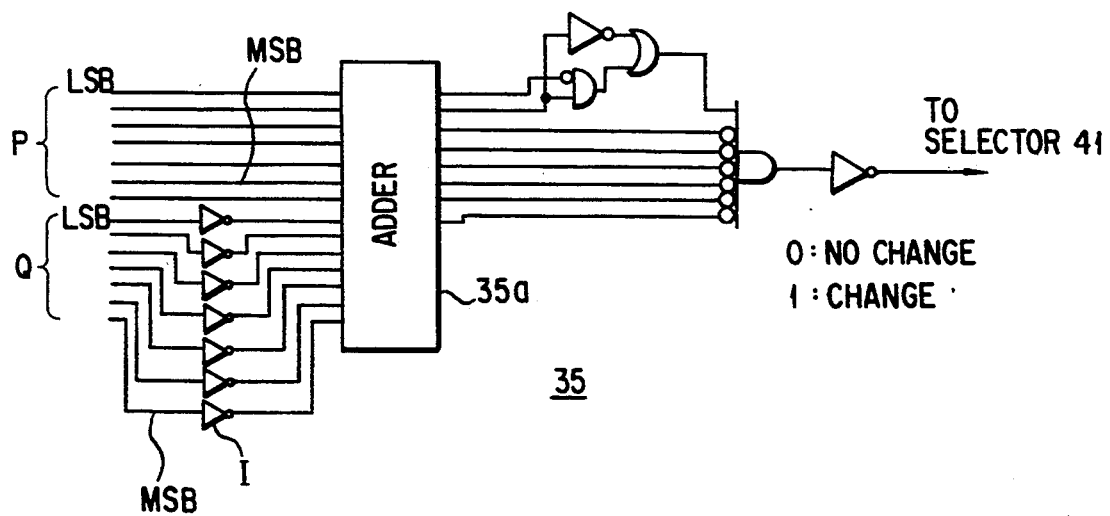
FIG. 3 is a block diagram showing the arrangement of a comparator in the embodiment.

The output terminals of the multiple circuits 29, 31, and 33 are respectively connected to the first input terminals of comparators 35, 37, and 29. The output terminal of the density estimating section 25 is connected to the second terminals of the comparators 35, 37, and 39. The comparators 35, 37, and 39 check the presence/absence of changes in the density of an input image in the main scanning direction, the sub-scanning direction, and an oblique direction (relative to both the main scanning direction and the sub-scanning direction). More specifically, the comparators 35, 37, and 39 compares two input estimated densities. The comparators 35, 37, and 39 are designed, for example, as shown in FIG. 3. Although only the comparator 35 will be described here, the remaining comparators 37 and 39 have the same arrangement.

FIG. 3 is a block diagram showing the arrangement of a comparator in the embodiment. Reference symbol P denotes an input from the multiple circuit 29; Q, a 7-bit input from the density estimating section 25; LSB, the least significant bit; and MSB, the most significant bit. The inputs Q are respectively inverted by inverters I and are added by an adder 35a. That is, the inputs Q are subtracted from the inputs P. In this case, when the difference between black pixel counts falls within the range of q1, the absence of density change is determined. When the difference falls outside the range of q1, the presence of density change is determined. The comparator 35 outputs a 1-bit signal of "0" when the absence of density change is determined; and a 1-bit signal of "1" when the presence of density change is determined.

The output terminals of the comparators 35, 37, and 39 are respectively connected to the first, second, and third input terminals of an aperture selecting section 41. The output terminal of the image quality determining section 11 is connected to the fourth input terminal of the aperture selecting section 41. The aperture selecting section 41 (to be described in detail later with reference to FIG. 8) selects an optimal scanning aperture to be used for a conversion position, i.e., a scanning aperture determined as a halftone density, on the basis of signals output from the comparators 35, 37, and 39 and received through the first to third input terminals, i.e., signals associated with the presence/absence of changes in the density of an image, and a signal output from the binary counter 11, i.e., a signal associated with image quality determination.

The output terminal of the aperture selecting section 41 is connected to the first input terminal of a selector 43. The output terminals of the multiple circuits 27, 29, 31, and 33 and the density estimating section 25 are connected to the second to sixth output terminals of the selector 43. The selector 43 outputs an estimated density in the optimal scanning aperture used for a conversion position, as a halftone density, in accordance with the selection of a scanning aperture by the aperture selecting section 41.

The output terminal of the selector 43 is connected to the input terminal of a flip-flop 45. The flip-flop 45 outputs halftone density data to the image processing section 9 in synchronism with the clock CK2. That is, the clock CK2 is input from the sequencer 13 to the flip-flop 45 and the density estimating sections 17, 29, 21, 23, and 25, and processing is performed in the flip-flop 45 and the density estimating sections 17, 19, 21, 23, and 25 in synchronism with the clock CK2.

$4 \times 8$, $8 \times 4$, rhomboid, $8 \times 8$, and $4 \times 4$ scanning apertures will be described next with reference to FIGS. 4A to 4E.

As shown in FIGS. 4A to 4E, in the embodiment, five types of scanning apertures are set. Of these scanning apertures, a scanning aperture expressed by "$4 \times 4$" in the main and sub-scanning directions is assigned with code 0; a scanning aperture expressed by "$4 \times 8$", as code 1; and a scanning aperture expressed by "$8 \times 4$", as code 2. A scanning aperture expressed by a rhomboid shape is assigned with code 3. A scanning aperture expressed by "$8 \times 8$" is assigned with code 4. The $4 \times 4$ scanning aperture shown in FIG. 4E is set in the density estimating section 17, and the $4 \times 8$ scanning aperture is set in the density estimating section 19. The $8 \times 4$, thomboid, and $8 \times 8$ scanning apertures are respectively set in the density estimating sections 21, 23, and 25. For example, the scanning aperture assigned with code 1 in FIG. 4A is a pixel memory having a capacity of $4 \times 8$ pixels. Data corresponding to 8 pixels in the sub-scanning direction are simultaneously input from the reference pixel memory 5 to this pixel memory, and sets of 8-pixel data are sequentially input to the pixel memory in the main scanning direction. When data corresponding to 4 pixel columns are input in the main scanning direction, the $4 \times 8$ memory is filled with pixel data. The scanning aperture assigned with code 2 in FIG. 4B is a memory having a capacity of $4 \times 8$ pixels. Data corresponding to 4 pixels in the sub-scanning direction are simultaneously input from the reference pixel memory 5 to this pixel memory, and sets of 4-pixel data are sequentially input to the pixel memory in the main scanning direction. When data corresponding to 8 pixel columns are input in the main scanning direction, the $8 \times 4$ memory is filled with pixel data. In inputting pixel data to the rhomboid scanning aperture assigned with code 3 in FIG. 4C, pixel data is input first to one-pixel memory area at the leading end of the scanning aperture in the main scanning direction, and pixel data is input to a 3-pixel memory area adjacent to the one-pixel memory area upon next scanning in the main scanning direction. Subsequently, pixel data is input to a 5-pixel memory area followed by a 7-pixel memory area. In this manner, pixel data are input to the rhomboid scanning aperture.

The arrangement of each density estimating section will be described below with reference to FIG. 5.

Figure 5:
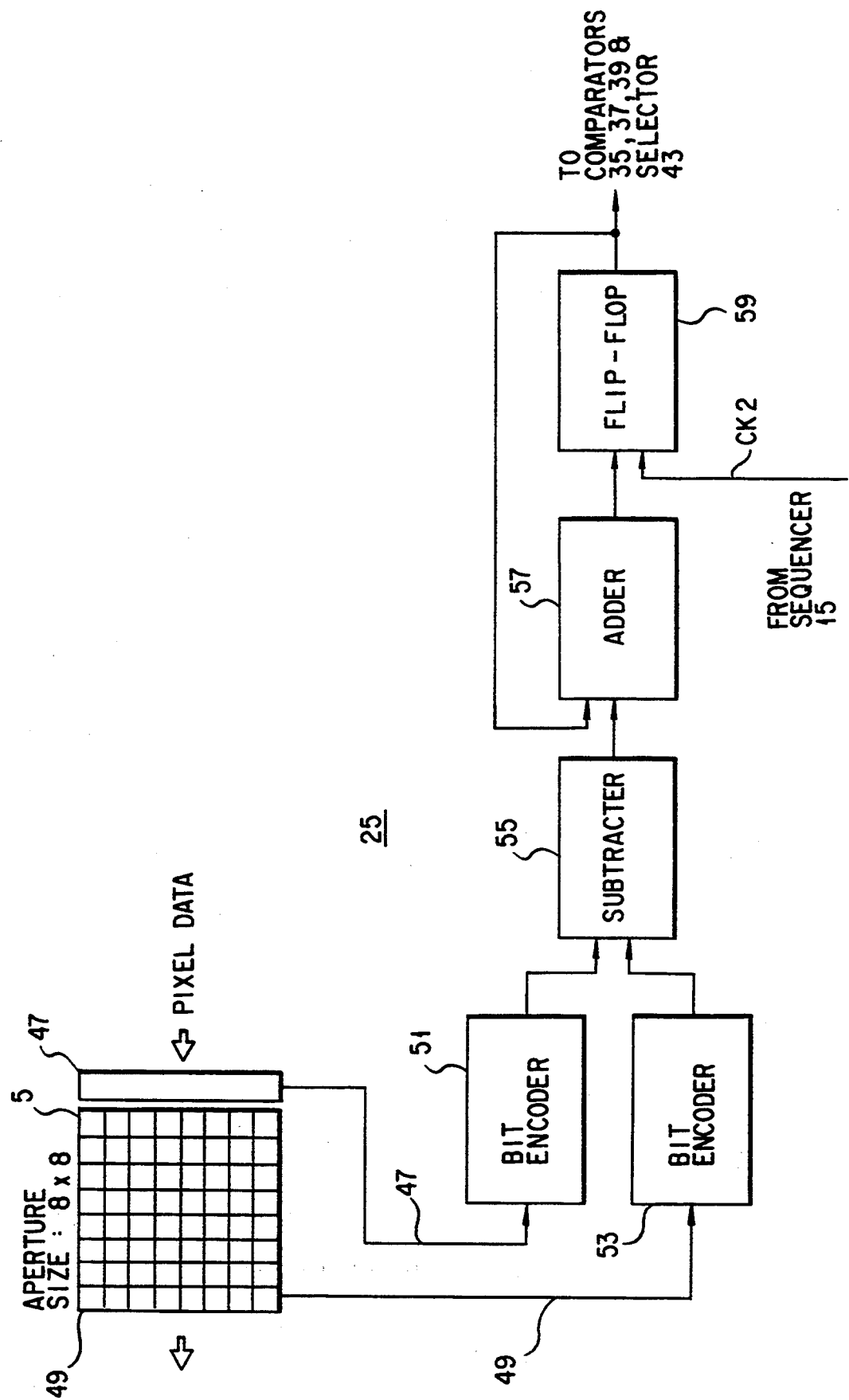
FIG. 5 is a block diagram showing the arrangement of a density estimating section in the embodiment.

FIG. 5 is a block diagram showing the arrangement of each density estimating section in the embodiment. Since the density estimating sections 17, 19, 21, 23, and 25 have the same arrangement except for scanning apertures, the density estimating section 25 will be described below as an example. In this case, the reference pixel memory 5 is also shown as a block.

As described above, the density estimating section 25 has the $8 \times 8$ scanning aperture and calculates the number of black pixels every time scanning is performed by one pixel column in the main scanning direction. A method of calculating the number of black pixels will be briefly described below. If, for example, an input image and an output image have the same size (magnification: 100%), the clocks CK1 and CK2 are output from the sequencer 13 in FIG. 1 at the same period. As a result, every time one pixel is input from the line memory 3 to the reference pixel memory 5 in response to the clock CK1, the halftone estimating section 7 causes the density estimating section 25 to calculate the number of black pixels while scanning by an amount corresponding to one pixel in the main scanning direction in response to the clock CK2. This calculation of the number of black pixels, performed every time one pixel is input, is performed by using an 8-pixel signal 47 newly input from the line memory 3 and an 8-pixel signal 49 excluded from the output side of the 8×8 scanning aperture upon input of the signal 47. In this case, each of the signals 47 and 49 consists of 8 bits.

FIG. 6A shows a state immediately before a pixel signal corresponding to the first 8 pixels is input from the line memory 3 to the reference pixel memory 5. In this case, the 8-pixel signal 47 obtained from the density estimating section 25 is a signal corresponding to the start pixels of the respective lines L1 to L8 of the line memory 3. The other 8-pixel signal 49 is a signal corresponding to 8 pixels p11 to P81 on the output side of the reference pixel memory 5.

When one clock CK2 is input in this state, the signal corresponding to the 8 start pixels of the respective lines L1 to L8 of the line memory 3 is supplied to the 8 pixels P18 to P88 on the input side of the reference pixel memory 5. In this case, the 8-pixel signal 47 obtained from the density estimating section 25 is a signal corresponding to pixels succeeding the start pixels of the lines L1 to L8 of the line memory 3. At this time, however, the other 8-pixel signal 49 has not appeared yet.

When the eight clock CK2 is supplied in this manner, the pixel signals corresponding to the lines L1 to L8 of the line memory 3 and the pixel signals stored in the reference pixel memory 5 have the relationship shown in FIG. 6B. That is, the signals corresponding to the 8 start pixels of the lines L1 to L8 of the line memory 3 are stored in the 8 pixels P11 to P81 on the output side of the reference pixel memory 5. In this state, pixel signals are stored at all the pixel positions in the reference pixel memory 5. In this case, the 8-pixel signal 47 obtained from the density estimating section 25 is a signal corresponding to the ninth pixels of the lines L1 to L8 of the line memory 3, counted from the start pixels.

Figure 7:
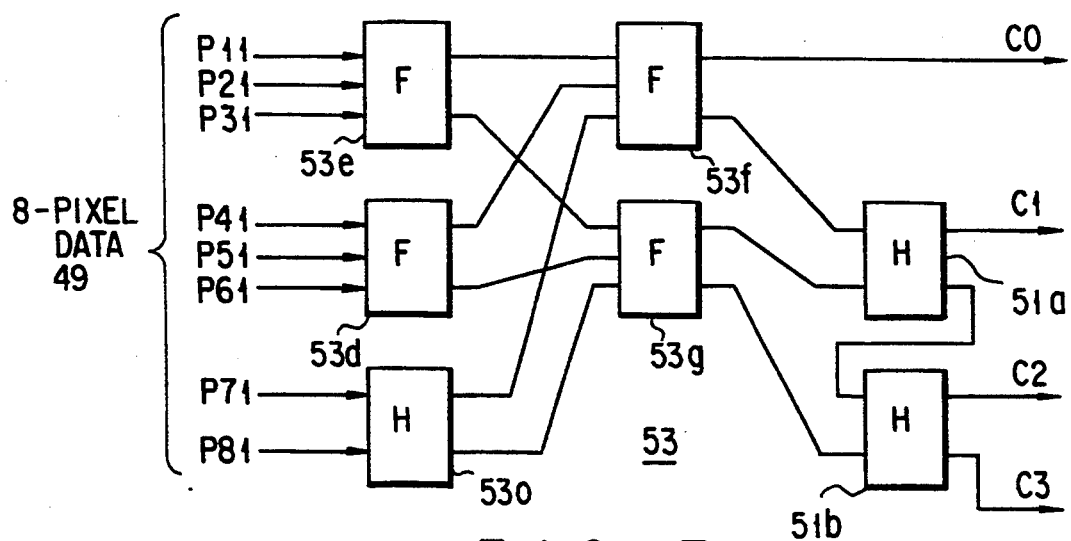
FIG. 7 is a block diagram showing an arrangement of a bit encoder in the embodiment.

The density estimating section 25 will be described below by referring to FIG. 5 again. The signals 47 obtained in the above-described manner are input to the input terminal of a bit encoder 51. The signals 49 are input to the input terminal of a bit encoder 53. In this embodiment, for example, the bit encoder 53 is constituted by two-input half adders 53a, 53b, and 53c and three-input full adders 53d to 35g, as shown in FIG. 7. The bit encoder 53 in FIG. 7 receives an 8-bit signal output from the 8 pixel positions P11 to P81 on the output side of the reference pixel memory 5, and calculates the number of black pixels, thus outputting the calculation result as output signals C0, C1, C2, and C3 corresponding to 4 bits. In this manner, the bit encoder 53 converts the 8-bit signal 49 corresponding to each 8 pixels into a 4-bit signal C0–C3, and outputs it. Similarly, the other encoder 51 converts the 8-bit signal 47 corresponding to 8 pixels into a 4-bit signal and outputs it.

The output terminals of the bit encoders 51 and 53 are respectively connected to the first and second input terminals of a subtracter 55. The subtracter 55 subtracts a signal input from the bit encoder 53 from a signal input from the encoder 51.

The output terminal of the subtracter 55 is connected to the first input terminal of an adder 57. The output terminal of the adder 57 is connected to the input terminal of a flip-flop 59. The output terminal of the flip-flop 59 is connected to the comparators 35, 37, 39, and 43 on the output side and to the second input terminal of the adder 57. The adder 57 adds a black pixel count, output from the subtracter 55, to a black pixel count read one clock ahead. This black pixel count one clock ahead is supplied from the flip-flop 59.

The clock CK2 is input from the sequencer 13 to the flip-flop 59. The flip-flop 59 supplies black pixel count data, as an estimated density, to the comparators 35, 37, and 39, and the selector 43 in synchronism with the clock CK2, and at the same time, feeds back the data to the adder 57.

The density estimating section 25 causes the bit encoders 51 and 53 to calculate the number of black pixels represented by the signals 47 and 49. The subtracter 55 then subtracts the value calculated by the bit encoder 53 from the value calculated by the encoder 51. With this subtraction, the difference between the black pixel count and the black pixel count before one-pixel shift is calculated. The value calculated by the subtracter 55 is added to the black pixel count before one-pixel shift. The black pixel count calculated by the adder 57 is supplied, as a signal representing an estimated density, from the flip-flop 59 to the subsequent circuits in synchronism with the clock CK2. The estimated density data output from the flip-flop 59 is fed back, as black pixel count data, to the adder 57.

Note that in the density estimating section 25, a value to be supplied to the subsequent circuits is directly supplied as an estimated density. However, in the density estimating sections 17, 19, 21, and 23 respectively having the 4×4, 4×8, 8×4, and rhomboid scanning apertures, since the areas of the scanning apertures are different from that of the density estimating section 25, values normalized by the above-described multiple circuits 27, 29, 31, and 33 are supplied as estimated densities.

In the above-described method of calculating the number of black pixels, an image is output at a one-to-one magnification with respect to an input image. When an output image is to be enlarged or reduced, the number of pixels to be converted is changed. Assume that an input image is to be reduced to $\frac{1}{2}$. In this case, if the clock periods are set such that two first clocks CK1 are output for every one second clock CK2, the number of black pixels is calculated every 2 pixel columns of the reference pixel memory 5 in the main scanning direction. As a result, the image obtained from the image processing section 9 is $\frac{1}{2}$ the image in the line memory 3. In enlargement of an image, the frequency of the clock CK2 may be set to be higher than that of the clock CK1. As described above, in this enlargement/reduction method, a specific pixel is selected from the pixels of an original image in accordance with a predetermined algorithm, and the value of the selected pixel is directly used as the value of a converted pixel. In another method, several pixels are selected from an original image, and an arithmetic operation of the selected pixels is performed, thereby determining the pixels of a converted image. For example, a converted pixel position detecting circuit as an example using such a method is shown in FIG. 4 in Jpn. Pat. Appln. KOKAI Publication No. 64-1072. Image enlargement/reduction processing may be performed by using such a circuit. In addition, as a sequencer for image enlargement/reduction processing, for example, the circuit shown in FIG. 15 in Jpn. Pat. Appln. KOKAI Publication No. 56-90375 may be used.

Figure 8:
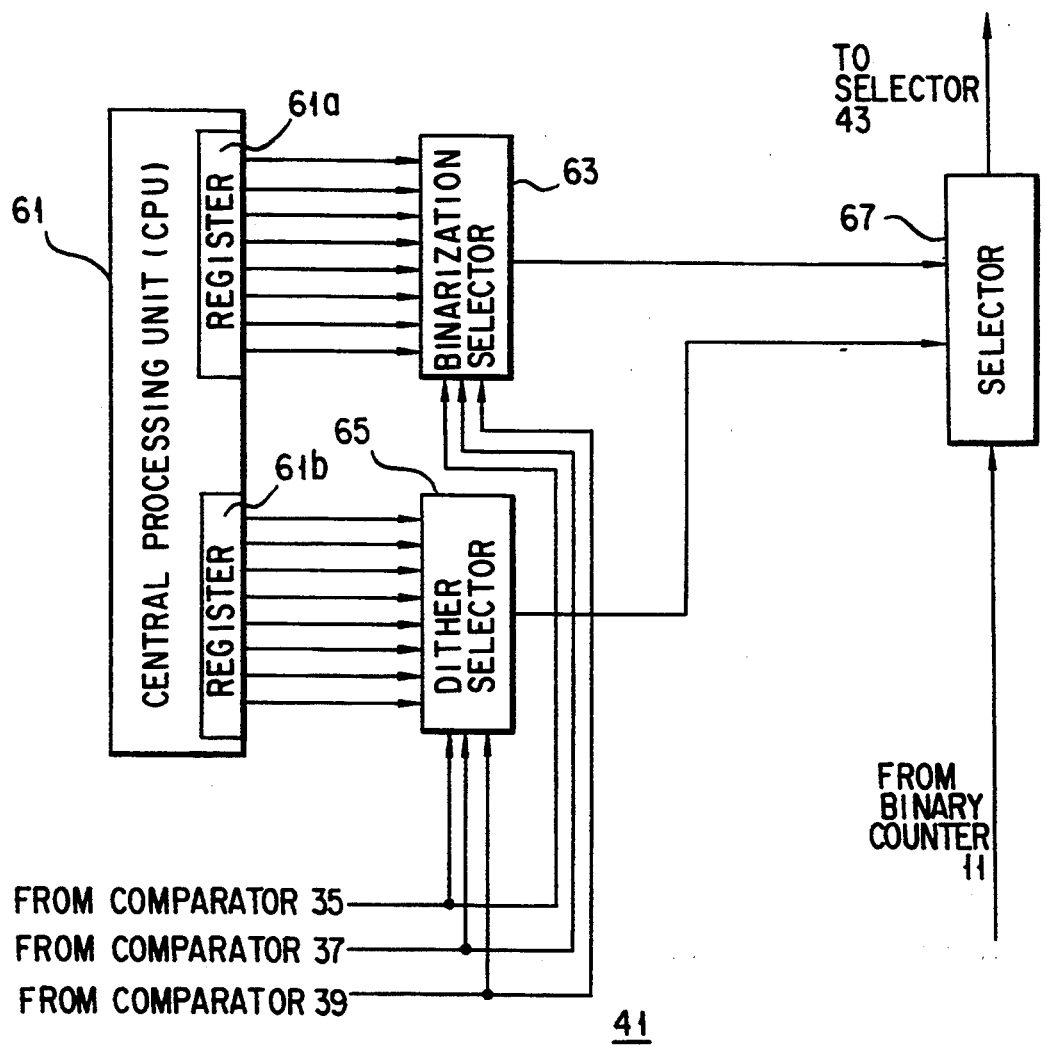
FIG. 8 is a block diagram showing the arrangement of an aperture selecting section in the embodiment.

The arrangement of the aperture selecting section 41 will be described next with reference to FIG. 8. FIG. 8 is a block diagram showing the arrangement of the aperture selecting section in the embodiment.

The aperture selecting section 41 includes a central processing unit (CPU) 61. In this case, the CPU 61 has a 3-bit configuration and is capable of outputting eight different signals "000" to "111" as parameters through a register 61a or 61b. Codes are set in correspondence with these signals. These codes correspond to the shapes of the scanning apertures described above with reference to FIGS. 4A to 4E, and five signals "0" to "4" are output using 3 bits.

The first to eighth output terminals of the register 61a are respectively connected to the first to eighth input terminals of a binarization selector 63. The binarization selector 63 further includes the ninth to eleventh input terminals, to which the output terminals of the comparators 35, 37, and 39 are respectively connected. The binarization selector 63 receives 1-bit data output from each of the comparators 35, 37, and 39, i.e., a total of 3 bits which indicate the density of an input image, and output a code indicating an optimal scanning aperture at a conversion position for a binary image. In outputting this code, a signal identical to the signals input from the comparators 35, 37, and 39 is selected from eight signals input from the register 61a of the CPU 61. After this selection, a code corresponding to the selected signal is output from the register 61a to the binarization selector 63. The binarization selector 63 then outputs this code.

Assume, in this case, that the CPU 61 outputs code 0 to the binarization selector 63 regardless of selected signals.

The ninth to sixteenth output terminals of the register 61b of the CPU 61 are respectively connected to the first to eighth input terminals of a dither selector 65. The dither selector 65 also has the ninth to eleventh input terminals, to which output signals from the comparators 35, 37, and 39 are respectively connected, similar to the binarization selector 63. Similar to the binarization selector 63, the dither selector 65 receives a total of 3-bit data from the comparators 35, 37, and 39 and outputs an optimal scanning aperture code at a conversion position for a dither image. In outputting this code, similar to the case of the binarization selector 63, a signal identical to the signals input from the comparators 35, 37, and 39 is selected from signals input from the CPU 61 through the register 61b. After this selection, a code corresponding to the selected signal is output from the register 61b to the dither selector 65. The dither selector 65 then outputs this code.

The dither selector 65 receives the eight different signals "000" to "111" as parameters from the CPU 61. In this case, five codes "0" to "4" are output.

The output terminals of the binarization selector 63 and the dither selector 65 are connected to the first and second input terminals of a selector 67, respectively. The third input terminal of the selector 67 is connected to the output terminal of the binary counter 11. The output terminal of the selector 67 is connected to the input terminal of the selector 43. The selector 67 selects a code indicating an optimal scanning aperture at a conversion position, from the codes output from the binarization selector 63 and the dither selector 65, on the basis of the determination result obtained by the binary counter 11, and outputs the selected code.

In the aperture selecting section 41 having the above-described arrangement, an optimal scanning aperture for pixels centered on a conversion position is selected in accordance with image quality and the direction of a change in the density of an image.

An aperture selecting operation in the aperture selecting section 41 will be described in detail next with reference to FIGS. 8 and 9. FIG. 9 shows a parameter table associated with an aperture selecting operation of the aperture selecting section in the embodiment.

Assume that the 3-bit signal output from the comparators 35, 37, and 39 and associated with the presence/absence of density change is "000", and the determination result obtained by the binary counter 11 as the image quality determining section is "1" indicating a dither image. In this case, code 4, i.e., the 8×8 scanning aperture, is selected as the one having the optimal halftone density by the selector 67. The selector 67 is, for example, a memory. When one bit from the binary counter 11 and three bits from the comparators 35, 37, and 39, i.e., a total of 4 bits, are used as an address signal for this memory, code 4 or data indicating an aperture size of 8×8 output.

Assume that the 3-bit signal from the comparators 35, 37, and 39 is "100", and the determination result obtained by the binary counter 11 as the image quality determining section is "1" indicating a dither image. In this case, code 1, i.e., the 4×8 scanning aperture, is selected. In the same manner as described above, aperture selection is performed with respect to "010", "110", and the like. If the determination result obtained by the binary counter 11 as the image quality determining section is "0" indicating a binary image, code 0 is output from the binarization selector 63 regardless of the comparison result obtained by the comparators 35, 37, and 39. That is, the 4×3 scanning aperture is selected as the one having an optimal halftone density by the selector 67. In this case, the 4×4 scanning aperture is selected because it has the minimum range and can prevent smoothing of an image in binarization of the image.

The overall flow of processing in the image processing apparatus 1 will be described below. Image data is input from the line memory 3 to the reference pixel memory 5. Thereafter, the image data is input to the halftone estimating section 7 and is input to the density estimating sections 17, 19, 21, 23, and 25 within the halftone estimating section 7.

The density estimating sections 17, 19, 21, 23, and 25 respectively calculate the numbers of black pixels in the respective scanning apertures. This operation has been described in detail above. Subsequently, the black pixel count data from the density estimating sections 17, 19, 21, and 23 are supplied to the multiple circuits 27, 29, 31, and 33 to be normalized. The normalized data are input to the comparators 35, 37, and 39. The comparators 35, 37, and 39 discriminate directions in which the density of the image changes, and output 1-bit signals, respectively.

The aperture selecting section 41 receives the signals, a total of 3 bits, from the comparators 35, 37, and 39.

The image quality determining section 11 outputs the determination result indicating whether the input image is a dither image or a binary image. A scanning aperture used as a halftone density is selected on the basis of these results.

Upon selection of a scanning aperture, halftone density data is output from the selector 43. This halftone density data is input to the image processing section 9. The image processing section 9 has a dither matrix and a fixed threshold value. Therefore, when the input image is determined as a dither image on the basis of the determination result obtained by the image quality determining section 11, the image processing section 9 performs re-dither processing. If the input image is a binary image, the image processing section 9 performs binarization processing.

In the image processing apparatus 1 having the above-described arrangement, processing is performed in synchronism with the clocks signals CK1 and CK2 from the sequencer 13.

The present invention is not limited to the above-described embodiment. For example, even if the shapes of scanning apertures and the criteria for determining the presence/absence of changes in the density of an image are changed, no problems are posed in executing the present invention. Various changes and modifications can be made within the spirit and scope of the invention.

As has been described above, according to the present invention, dither processing can be properly performed, and the overall processing speed of the image processing apparatus can be increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:
 input means for inputting an image;
 means for estimating a density of said image, which is inputted by said input means, said estimating means including:
  first density estimation means, having a first scanning aperture, for estimating a first density of said image, which is inputted by said input means, by using said first scanning aperture;
  second density estimation means, having a second scanning aperture that is larger than said first scanning aperture, for estimating a second density of said image, which is inputted by said input means, by using said second scanning aperture; and
  control means for simultaneously causing said first and second density estimation means to estimate said first and second densities, respectively;
 comparison means for comparing said first density with said second density;
 selection means for selecting one of said first and second densities; and
 processing means for processing said image, which is inputted by said input means, in accordance with said selected one of said first and second densities.

2. An image processing apparatus according to claim 1, wherein said comparison means detects a difference between said first and second densities, and said selection means comprises:
 first selection means for selecting said first density when said difference between said first and second densities is detected by said comparison means; and
 second selection means for selecting said second density when said difference between said first and second densities is not detected by said comparison means.

3. An image processing apparatus comprising:
 input means for inputting an image;
 means for estimating a density of said image, which is inputted by said input means, said estimating means including:
  first density estimation means, having a first scanning aperture, for estimating a first density of said image, which is inputted by said input means, by using said first scanning aperture, said first scanning aperture having a scanning aperture size of $4 \times 8$ pixels;
  second density estimation means, having a second scanning aperture, for estimating a second density of said image, which is inputted by said input means, by using said second scanning aperture, said second scanning aperture having a scanning aperture size of $8 \times 4$ pixels;
  third density estimation means, having a third scanning aperture, for estimating a third density of said image, which is inputted by said input means, by using said third scanning aperture, said third scanning aperture having a scanning aperture size that is rhomboid in shape;
  fourth density estimation means, having a fourth scanning aperture, for estimating a second density of said image, which is inputted by said input means, by using said fourth scanning aperture, said fourth scanning aperture having a scanning aperture size of $8 \times 8$ pixels;
  control means for simultaneously causing said first, second, third, and fourth density estimation means to estimate said first, second, third, and fourth densities, respectively;
 comparison means for comparing said first density with said fourth density;
 selection means for selecting one of said first, second, third, and fourth densities; and
 processing means for processing said image, which is inputted by said input means, in accordance with said selected one of said first, second, third, and fourth densities.

4. An image processing apparatus according to claim 3, wherein said comparison means comprises:
 first comparison means for comparing said first density with said fourth density;
 second comparison means for comparing said second density with said fourth density; and
 third comparison means for comparing said third density with said fourth density.

5. An image processing apparatus according to claim 4, wherein said selection means includes a parameter table that represents a relationship between first codes, which denote said sizes of said first, second, third, and fourth scanning apertures, and second codes, which denote a combination of said comparisons made by said first, second, and third comparison means, and means for outputting data indicative of one of said first, second, third, and fourth density estimation means by referring to said first and second codes.

* * * * *